(12) United States Patent
Takeuchi et al.

(10) Patent No.: US 7,525,437 B2
(45) Date of Patent: Apr. 28, 2009

(54) WIRELESS SIGNAL RECEIVER

(75) Inventors: Daisuke Takeuchi, Kawasaki (JP); Kei Yonezawa, Yokohama (JP); Shuji Terada, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 11/602,916

(22) Filed: Nov. 20, 2006

(65) Prior Publication Data

US 2007/0229265 A1 Oct. 4, 2007

(30) Foreign Application Priority Data

Jan. 18, 2006 (JP) ............................. 2006-009976

(51) Int. Cl.
*G08B 13/14* (2006.01)
(52) U.S. Cl. .................................. 340/572.1; 340/10.5
(58) Field of Classification Search ............. 340/572.1, 340/10.1, 10.3, 10.5, 10.51; 714/25
See application file for complete search history.

(56) References Cited

U.S. PATENT DOCUMENTS 7,005,965 B2 * 2/2006 Chen et al. ................. 340/10.3
7,317,378 B2 * 1/2008 Jarvis et al. ................. 340/10.1
7,425,896 B2 * 9/2008 Kawamata ............... 340/572.1
2007/0241865 A1 * 10/2007 Sato ........................... 340/10.5

FOREIGN PATENT DOCUMENTS

JP 2000-205888 7/2000
JP 2004-112482 4/2004

* cited by examiner

*Primary Examiner*—John A Tweel, Jr.
(74) *Attorney, Agent, or Firm*—Townsend and Townsend and Crew LLP

(57) ABSTRACT

Information optimal for a place where a user is located is provided to the user by specifying the place in a short range using RFID tags and a terminal which the user holds. To accomplish this, an RFID reader-equipped information terminal performs a process of reading RFID tags attached to arbitrary places a predetermined number of times per unit time and automatically measures a distance between the RFID reader-equipped information terminal and each RFID tag based on the number of times each responding RFID tag has been able to be read. A position at which the user is located is specified based on the automatically measured distance and information suitable for the position is then provided to the user.

39 Claims, 15 Drawing Sheets

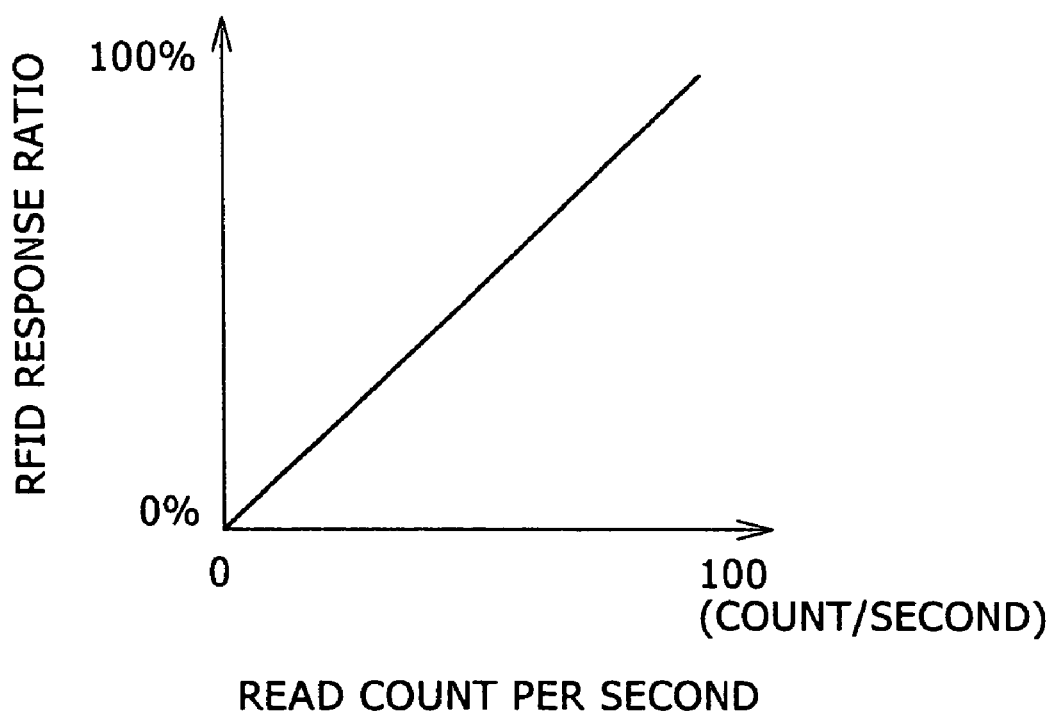

FIG. 10A (a) COUNTING FILE 160

| ID161 | RFID READ COUNT 162 |
|---|---|
| 10101010101 | 80 TIMES |
| 10101010102 | 20 TIMES |

(b) DISTANCE DEFINITION DB 120

| RFID RESPONSE RATIO 123 | DISTANCE 121 TO OBJECT | POSITIONAL RELATIONSHIP 122 WITH OBJECT |
|---|---|---|
| 0%~30% | 7m OR MORE | DISTANT |
| 31%~70% | 3m~7m | INTERMEDIATE |
| 71%~100% | 0m~3m | NEAR |

(c) DISTANCE SPECIFYING DB 130

| RFID READ CONT RANGE 131 | POSITIONAL RELATIONSHIP 132 WITH OBJECT |
|---|---|
| 0~30 | DISTANT |
| 31~70 | INTERMEDIATE |
| 71~100 | NEAR |

(d) DISTANCE DETERMINATION FILE 170

| ID161 | POSITIONAL RELATIONSHIP 172 WITH OBJECT |
|---|---|
| 10101010101 | NEAR |
| 10101010102 | INTERMEDIATE |
| 10101010103 | DISTANT |

(e) CONTENT DB 140

| ID141 | POSITIONAL RELATIONSHIP 142 WITH OBJECT | CONTENT 143 |
|---|---|---|
| 10101010101 | NEAR | CONTENT A-01 |
| 10101010101 | INTERMEDIATE | CONTENT A-02 |
| 10101010101 | DISTANT | CONTENT A-03 |

FIG.10B (f) DISPLAY MEGNIFICATION DB 150

| RFID READ CONT RANGE 151 | DISPLAY MAGNIFICATION 152 |
|---|---|
| 0~20 | 1.0X |
| 21~40 | 1.5X |
| 41~60 | 2.0X |
| 61~80 | 2.5X |
| 81~100 | 3.0X |

(g) LOG FILE 165

| ID166 | RFID READ COUNT 167 |
|---|---|
| 10101010101 | 70 TIMES |
| 10101010102 | 15 TIMES |
| 10101010103 | 5 TIMES |

(h) BEHAVIORAL STATE DB 180

| RFID READ COUNT CHANGE 181 | BEHAVIORAL STATE 182 |
|---|---|
| -100~-20 | MOVING AWAY |
| -19~19 | MOTIONLESS |
| 20~100 | APPROACHING |

(i) BEHAVIORAL STATE FILE 185

| ID186 | BEHAVIORAL STATE 187 |
|---|---|
| 10101010101 | APPROACHING |
| 10101010102 | APPROACHING |
| 10101010103 | MOVING AWAY |

FIG. 10C (j) CONTENT DB 145 ADDED WITH BEHAVIORAL STATES

| ID146 | POSITIONAL RELATIONSIHP 147 WITH OBJECT | BEHAVIORAL STATE 148 | CONTENT 149 |
|---|---|---|---|
| 10101010101 | NEAR | MOVING AWAY | CONTENT A-01-01 |
| 10101010101 | NEAR | MOTIONLESS | CONTENT A-01-02 |
| 10101010101 | NEAR | APPROACHING | CONTENT A-01-03 |
| 10101010101 | INTERMEDIATE | MOVING AWAY | CONTENT A-02-01 |
| 10101010101 | INTERMEDIATE | MOTIONLESS | CONTENT A-02-02 |
| 10101010101 | INTERMEDIATE | APPROACHING | CONTENT A-02-03 |
| 10101010101 | DISTANT | MOVING AWAY | CONTENT A-03-01 |
| 10101010101 | DISTANT | MOTIONLESS | CONTENT A-03-02 |
| 10101010101 | DISTANT | APPROACHING | CONTENT A-03-03 |
| | | | |

(k) CONTENT DB 190 FOR OUTPUT BASED ON TWO CONDITONS

| ID191 | ID192 | POSITIONAL RELATIONSIHP 193 WITH ID 191 | POSITIONAL RELATIONSIHP 194 WITH ID 192 | CONTENT 195 |
|---|---|---|---|---|
| 10101010101 | 10101010102 | NEAR | NEAR | CONTENT S-01-01 |
| 10101010101 | 10101010102 | NEAR | INTERMEDIATE | CONTENT S-01-02 |
| 10101010101 | 10101010102 | NEAR | DISTANT | CONTENT S-01-03 |
| 10101010101 | 10101010102 | INTERMEDIATE | NEAR | CONTENT S-02-01 |
| 10101010101 | 10101010102 | INTERMEDIATE | INTERMEDIATE | CONTENT S-02-02 |
| 10101010101 | 10101010102 | INTERMEDIATE | DISTANT | CONTENT S-02-03 |
| 10101010101 | 10101010102 | DISTANT | NEAR | CONTENT S-03-01 |
| 10101010101 | 10101010102 | DISTANT | INTERMEDIATE | CONTENT S-03-02 |
| 10101010101 | 10101010102 | DISTANT | DISTANT | CONTENT S-03-03 |
| | | | | |

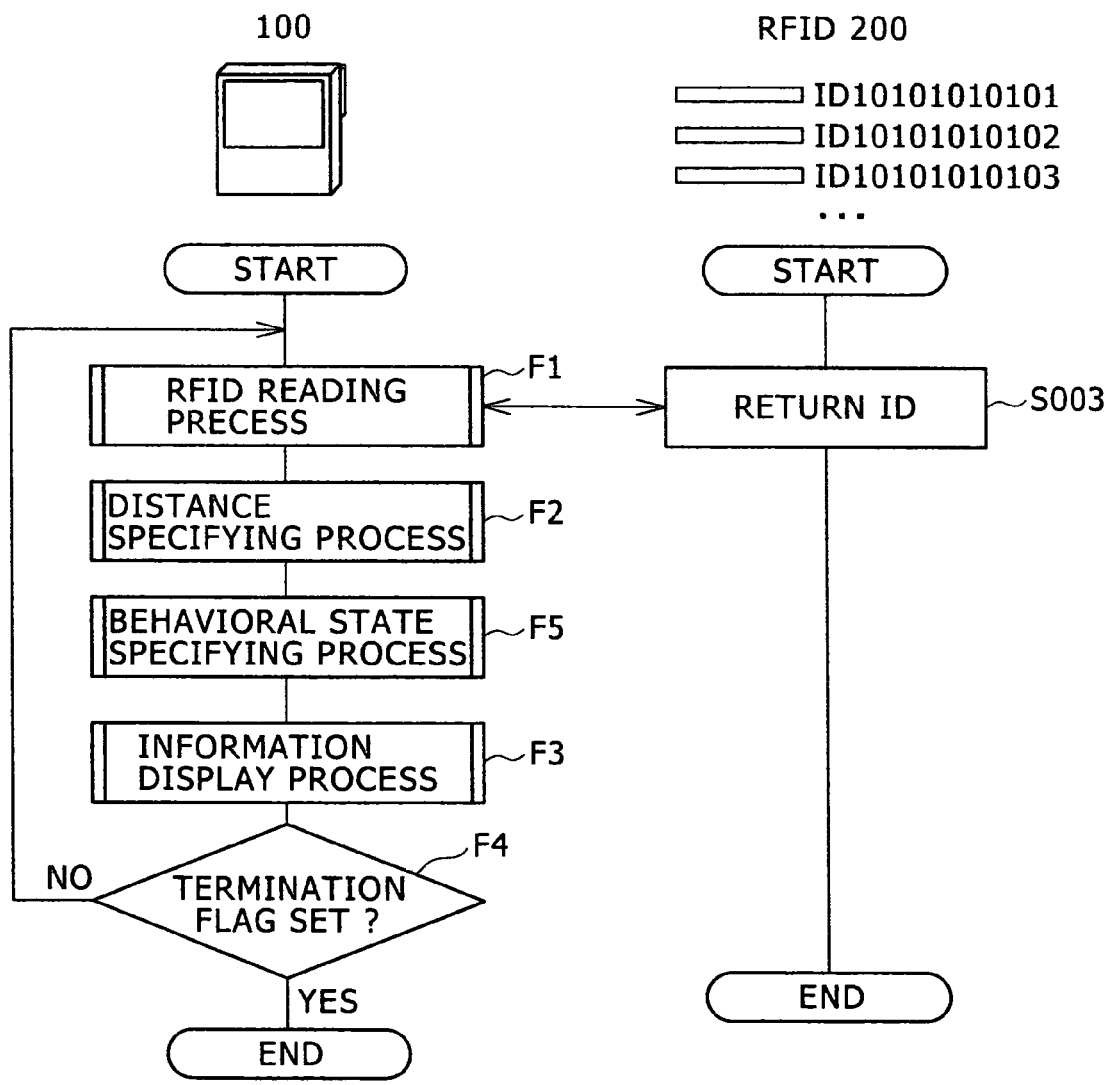

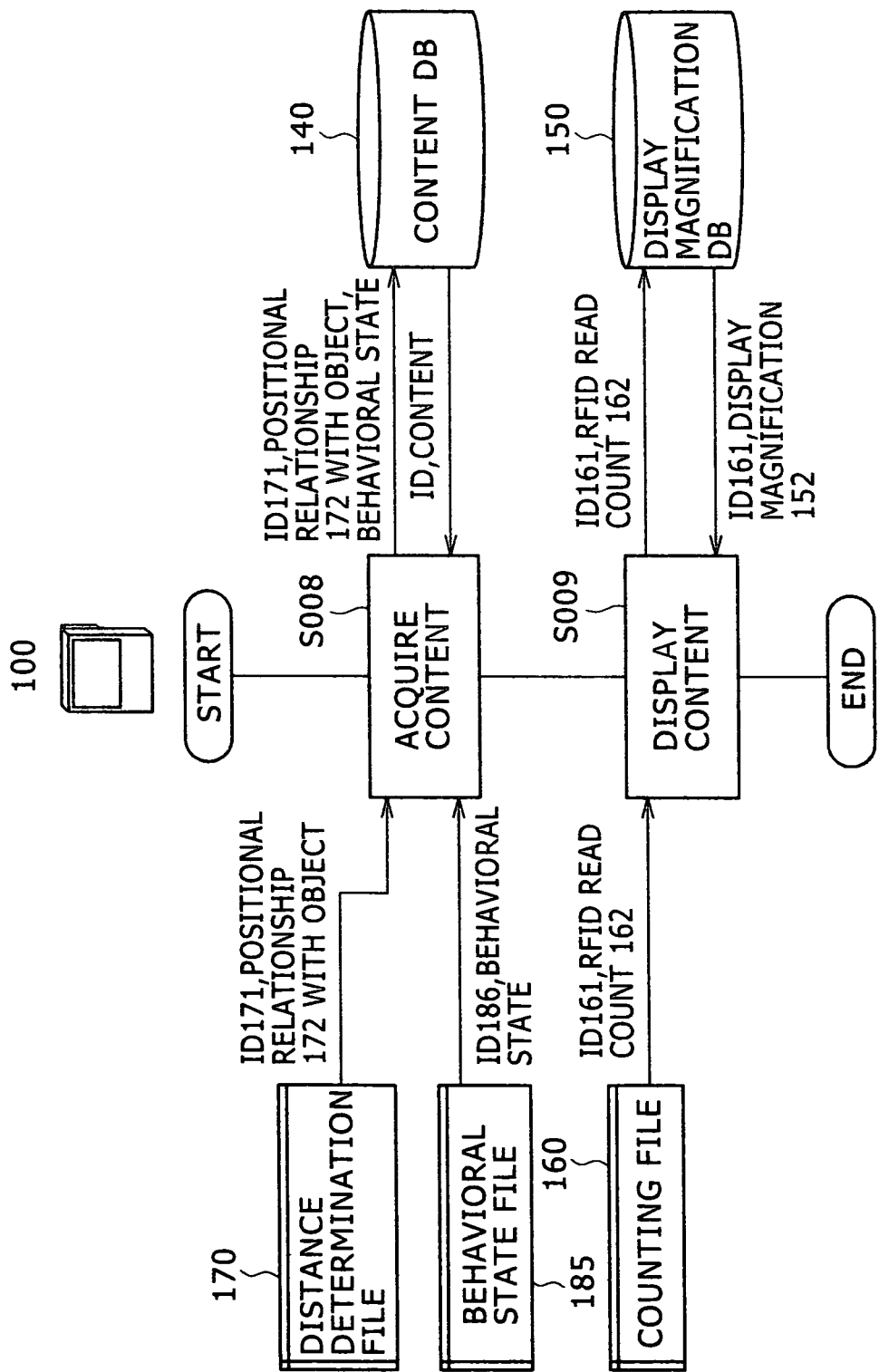

WIRELESS SIGNAL RECEIVER

BACKGROUND OF THE INVENTION

1. Field of the Invention

The present invention relates to information processing using received signals in a wireless signal receiver, which receives signals transmitted from tags (particularly, RFID tags) and an information providing technology at least using received signals or a distance measurement (estimation) technology using received signals, and more particularly to an information providing system and method that provides suitable information according to the position of a person who is located in an arbitrary place such as a station premise, a street or shopping center, a department store, an art museum, or a theme park.

2. Description of the Related Art

Recently, ubiquitous network environments in which it is possible to access a network anywhere at any time have been developed to realize ubiquitous information society. Especially, the spread of portable information devices using a short-distance wireless technology or a mobile communication network for moving bodies is remarkable. One example of a conventional technology for such a portable information device providing information suitable for a place, where a person who holds the portable information device is located, to the person is described in Japanese Published Unexamined Patent Application No. 2004-112482 (Reference 1). In this technology, a place where a person who holds a wireless LAN terminal such as a PC or PDA is located is specified from the intensity of wireless LAN signals propagated between the wireless LAN terminal and a plurality of base stations such as wireless LAN access points and information optimal for the specified place is provided to the person through the terminal. Another example of this technology is a system which measures the distance between a terminal and base stations based on the length of propagation time of a laser pulse from each base station, specifies a place where a person who holds the terminal is located, and provides information optimal for the place to the user through the terminal.

Another technology is described, for example, in Japanese Published Unexamined Patent Application No. 2002-205888 (Reference 2). In this technology, an inexpensive Radio Frequency Identification (RFID) tag is installed at every position. An ID can be assigned to each RFID tag to uniquely identify each position (or place). Using a passive RFID tag, which requires no power, is cost-efficient. An RFID reader in a system using this technology reads an ID of an RFID tag when a person who holds the reader is near a specific place and specifies the place from the read ID.

SUMMARY OF THE INVENTION

However, in the conventional technology described in the Reference 1, it is necessary that a wireless LAN base station be installed at every position since the distance is measured based on the propagation time or intensity of radio signals. This significantly increases the installation or operation costs of base stations and thus this conventional technology is impractical.

Since the readable range varies depending on the frequency band of radio waves used for communication with RFID tags, the conventional technology described in the Reference 2 has the following two problems. For example, when RFID tags with a relatively short readable range of about 1 meter are used, RFID tags must be installed at desired positions at intervals of 1 meter. Thus, this conventional technology also requires high costs to install RFID tags. Meanwhile, when RFID tags with a relatively large readable range of about 10 meters are used, the reader reads an ID from an RFID tag at a position 10 meters away from the RFID tag and therefore it can perform distance measurement at intervals of only 10 meters. Thus, it is difficult for this conventional technology to provide optimal information within a shorter range (i.e., more accurately).

Therefore, the present invention has been made in view of the above problems, and it is an object of the present invention to realize desired information processing using RFID tags and a terminal used by a user.

It is another object of the present invention to provide a distance measurement system and method for estimating the distance to an RFID tag and to provide desired information.

In accordance with the present invention, the above and other objects can be accomplished by information processing control based on the number of signals an information terminal has received (or the number of times it has received a signal) in a specific period. In the following description, the number of times the information terminal has received a signal is also referred to as a reception count. The information processing includes measuring the positional relationship of the information terminal with an RFID tag based on a reception count of a signal from the RFID tag. This positional relationship includes the distance between the RFID tag and the information terminal and may be expressed not only by numerical values in meters but also by words indicating relative distances such as nearer. The present invention also includes specifying and outputting content based on the reception count.

In accordance with one aspect of the present invention, there is provided an information providing system for providing information to a user who holds an information terminal, wherein a number of RFID tags are disposed at arbitrary positions in an arbitrary area, the information providing system including an RFID reader that receives an ID from an RFID tag as a response to an RFID reading signal that is generated by the information terminal a predetermined number of times in a specific time interval; a counter for counting, in each specific time interval, the number of IDs that were able to be received from each RFID tag in the specific time interval; a distance specifier for specifying a distance to an RFID tag as an object based on results of counting; a content acquirer for acquiring content to be displayed based on the specified distance; and a display for displaying the acquired content.

In accordance with another aspect of the present invention, there is provided an information providing system for providing information to a user who holds an information terminal, wherein a number of RFID tags are disposed at arbitrary positions in an arbitrary area, the information providing system including an RFID reader that receives an ID from an RFID tag as a response to an RFID reading signal that is generated by the information terminal a predetermined number of times in a specific time interval; a counter for counting, in each specific time interval, the number of IDs that were able to be received from each RFID tag in the specific time interval; a behavioral state determiner for retaining, as a log, a counting result of each specific time interval while obtaining the difference between counting results of current and immediately previous time intervals to determine a behavioral state of a user; a distance specifier for specifying a distance to an RFID tag as an object based on counting results; a content acquirer for acquiring content to be displayed based on the specified distance and the behavioral state of the user; and a display for displaying the acquired content.

In accordance with the present invention, information optimal for a place where a user is located can be provided to the user by specifying the place in a shorter range (i.e., more accurately).

BRIEF DESCRIPTION OF THE DRAWINGS

The above and other objects, features and other advantages of the present invention will be more clearly understood from the following detailed description taken in conjunction with the accompanying drawings, in which:

FIG. 9 illustrates the relationship between the response ratio of an RFID tag and the number of times the RFID tag is read by an RFID reader;

FIG. 10A illustrates a structure (1) of internal files and DBs used in an information providing system according to an embodiment of the present invention;

FIG. 10B illustrates a structure (2) of internal files and DBs used in an information providing system according to an embodiment of the present invention;

FIG. 10C illustrates a structure (3) of internal files and DBs used in an information providing system according to an embodiment of the present invention;

FIG. 12 is a flowchart of an overall basic procedure of a second embodiment of the present invention; and FIG. 13 is a flowchart of a detailed procedure of an information display process at the step F3 of displaying content in the flowchart shown in FIG. 12 in which the behavioral state of a person is added to conditions used for a process of acquiring the content.

DESCRIPTION OF THE PREFERRED EMBODIMENTS

Embodiments of the present invention applied to an information provision system and method will now be described in detail with reference to the drawings.

Figure 1:
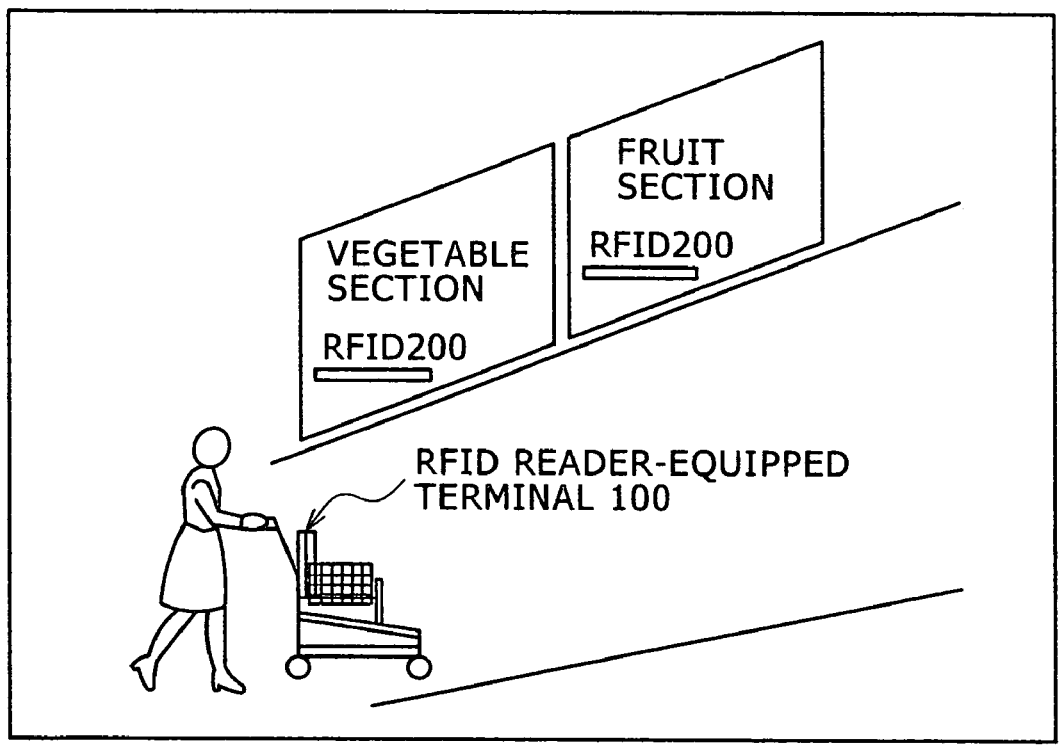
FIG. 1 illustrates an example of the usage of an information provision system according to an embodiment of the present invention.

FIG. 1 illustrates an example of the usage of an information provision system according to an embodiment of the present invention. The embodiments of the present invention, which are described below, are applied to provide product information inside a shopping center. In FIG. 1, reference numeral "100" denotes an information terminal including an RFID reader and "200" denotes an RFID tag.

The information provision system according to the present invention shown in FIG. 1 includes an RFID reader-equipped information terminal 100 and RFID tags 200 attached to arbitrary places. In the example shown in FIG. 1, an RFID tag 200 is attached to each product display section (for example, a vegetable section and a fruit section) in a shopping center. The RFID reader-equipped information terminal 100 is mounted on each shopping cart which customers use to do shopping in a shopping center. The RFID reader-equipped information terminal 100 and the RFID tag 200 are designed to communicate information with each other wirelessly, for example, over radio waves at frequencies in the Ultra High Frequency (UHF) band. The RFID reader-equipped information terminal 100 and the RFID tag 200 can communicate up to a distance of about 10 meters. In the present invention, the maximum communication distance is not limited to 10 meters.

As described below, in the embodiments of the present invention, information such as position information and content information is all stored in the RFID reader-equipped information terminal 100. However, the information provision system according to the present invention may also be constructed to allow the information terminal 100 to acquire such information by accessing databases, which are under centralized management of a center server (not shown), through a network. When there are a very large number of RFID reader-equipped information terminals 100, this construction can remove the time required to update information such as content information in all information terminals one by one, simply by updating content information in the center server. This makes it possible to provide information terminals at low cost.

Figure 2:
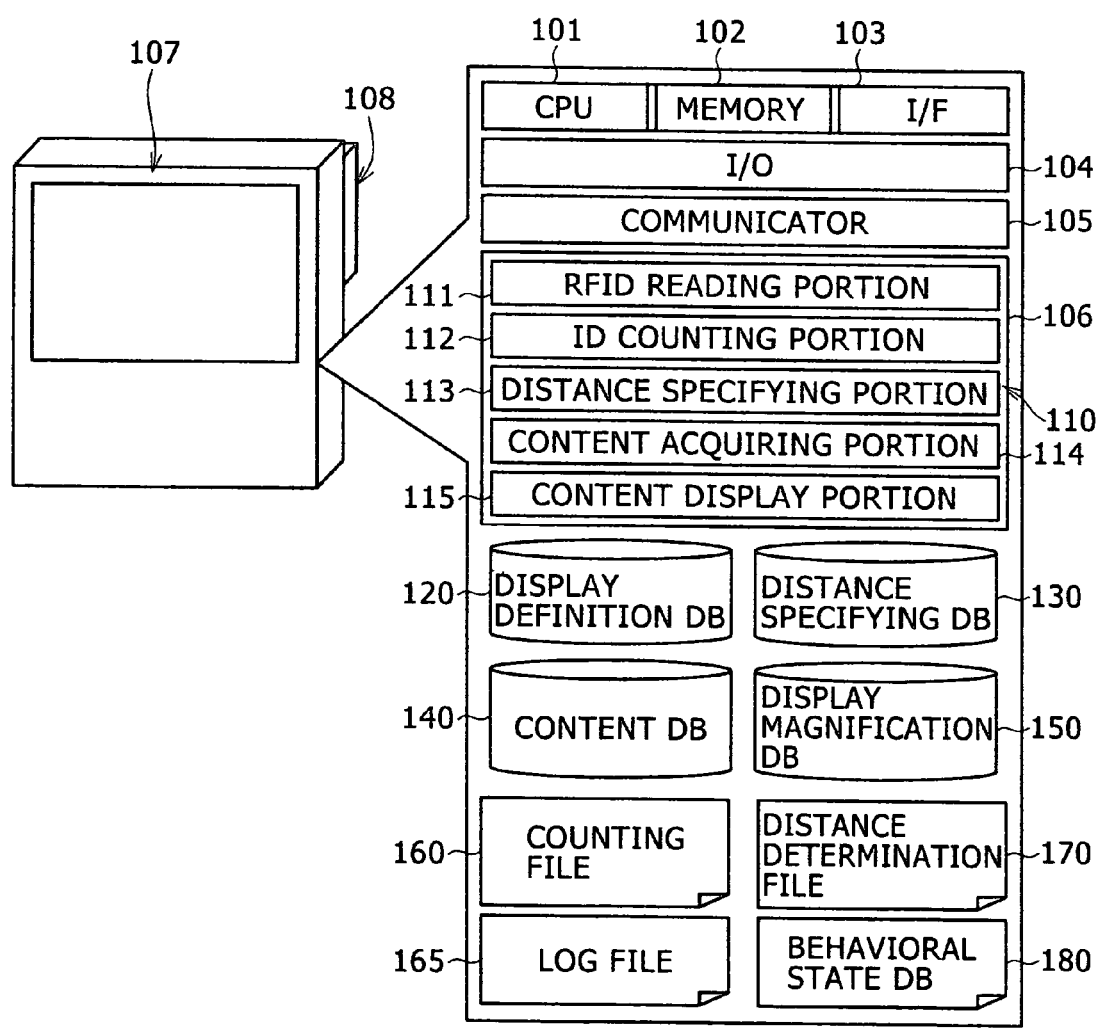
FIG. 2 is a block diagram of an RFID reader-equipped information terminal.

FIG. 2 is a block diagram of the RFID reader-equipped information terminal 100. In FIG. 2, reference numeral "101" denotes a CPU, "102" denotes a memory, "103" denotes an interface (I/F), "104" an input/output (I/O), "105" denotes a communicator, "106" denotes a program database (DB), "107" denotes a display, "108" denotes an RFID reader, "110" denotes a program group, "111" denotes an RFID reading portion, "112" denotes an ID counting portion as an ID counter, "113" denotes a distance specifying portion as a distance specifier, "114" denotes a content acquiring portion as a content acquirer, "115" denotes a content display portion as a content display, "120" denotes a distance definition DB, "130" denotes a distance specifying DB, "140" denotes a content DB, "150" denotes a display magnification DB, "160" denotes a counting file, "165" denotes a log file, "170" denotes a distance determination file, and "180" denotes a behavioral state DB.

As shown in FIG. 2, the RFID reader-equipped information terminal 100 has the RFID reader 108 and the display 107 and also includes the program group 110 that includes a variety of function units stored in the program DB 106 included in a rewritable, nonvolatile memory or the like, the interface 103 that is an I/O interface for the display 107 and a keyboard or buttons (not shown) which are generally included in computers, the RFID reader 108 that functions to read RFID tags, the communicator 105 that transmits and receives a variety of data through a network, the memory 102 in which a program group 110 is read and stored, the CPU 101 that is a computing device that executes a program read from the memory 102, and the I/O 104 that performs data buffering between the communicator 106 and a variety of function units and performs a variety of interfacing processes. The RFID reader-equipped information terminal 100 also includes a variety of files and DBs as described below, which are stored in a rewritable, nonvolatile memory.

Figure 3:
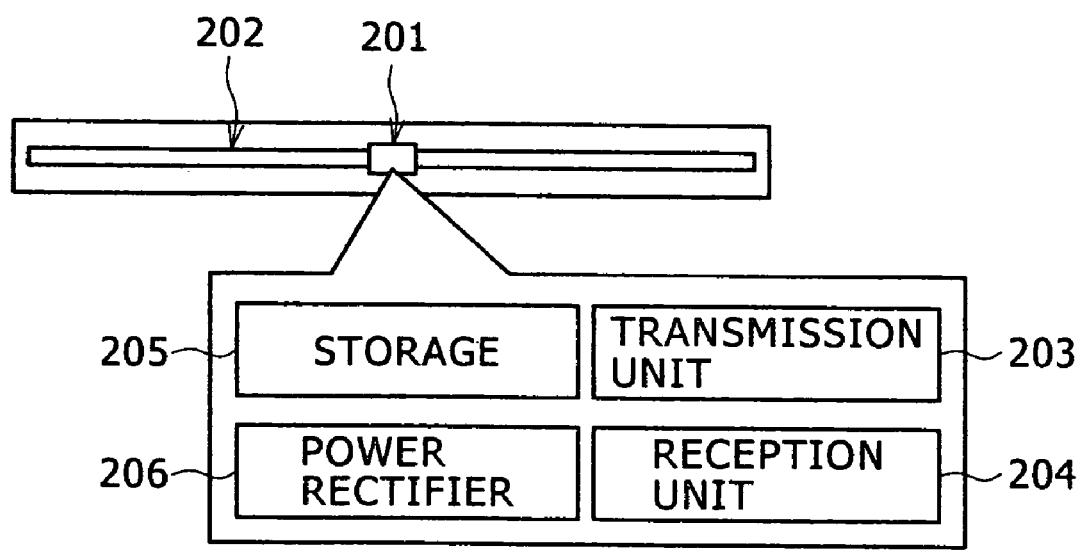
FIG. 3 illustrates a structure of an RFID tag.

FIG. 3 illustrates a structure of the RFID tag 200. In FIG. 3, reference numeral "201" denotes an IC chip, "202" denotes an antenna, "203" denotes a transmission unit, "204" denotes a reception unit, "205" denotes a storage, and "206" denotes a power rectifier.

A Radio Frequency Identification (RFID) tag used in the embodiments of the present invention is a so-called passive RFID tag and includes an IC chip 201 and an antenna 202. The IC chip 201 includes the transmission unit 203 for transmitting an ID of the RFID tag, the reception unit 204 for receiving radio waves from the RFID reader-equipped information terminal 100, the storage 205 for storing an unique ID, and the power rectifier 206 for converting electromagnetic energy received through the antenna 202 into a DC power voltage. Of course, an active RFID tag may also be used in the present invention. However, taking into consideration the maintenance time such as battery replacement, it is preferable to use a passive RFID tag.

FIGS. 10A to 10C illustrate structures of internal files and DBs used in the information provision system according to an embodiment of the present invention. Here, the structures of the files and DBs are described before procedures and operations of the information provision system are described. Specifically, FIG. 10A to 10C illustrate example data structures of (a) a counting file 160, (b) a distance definition DB 120, (c) a distance specifying DB 130, (d) a distance determination file 170, (e) a content DB 140, (f) a display magnification DB 150, (g) a log file 165, (h) a behavioral state DB 180, (i) a behavioral state file 185, (j) a content DB 145 to which behavioral state is added, and (k) a content DB 190 for outputting content based on conditions associated with positions of two tags. Although these files and DBs are all stored in the RFID reader-equipped terminal 100 in the embodiments of the present invention, only those required for the first embodiment are shown as being included in the RFID reader-equipped terminal 100 in FIG. 2.

The counting file 160 is created by counting the number of times the RFID reader-equipped information terminal 100 was able to read an ID with which each of a plurality of RFID tags 200 has responded to a radio wave for reading an ID 100 times per second, the radio wave being transmitted from the terminal 100. As shown in FIG. 10A(a), an ID of an RFID tag 200 read by the RFID reader-equipped information terminal 100 is stored in a record of an ID 161 and an RFID read count 162 is set to "1" when the ID from the RFID tag has been read. Here, if the same ID is present in the record of the ID 161, the RFID read count 162 is updated by increasing it by one. That is, the counting file 160 is a collection of records, each associating a read ID 161 of an RFID tag 200 as a key with an RFID read count 162. The counting file 160 is used, for example, to generate a distance determination file 170 after the counting for 1 second and to determine the magnification of content to be displayed on the display 107 of the RFID reader-equipped information terminal 100. While the contents of the counting file 160 are reset in each period, the read count is recorded in a log file so as to help in analyzing changes in the reading of each ID, which will be described later.

The distance definition DB 120 stores data used to define the distance between the RFID reader 108 and the RFID tag 200. As shown in FIG. 10A(b), the distance definition DB 120 associates a response ratio 123, which is the ratio of the number of times the RFID reader 108 has received a response signal from an RFID tag to the number of times the RFID reader 108 has performed RFID reading per unit time, a distance 121 to an object (i.e., the RFID tag 200), and the positional relationship 122 with the object. Accordingly, the distance definition DB 120 includes a collection of records, each including the response ratio 123, the distance 121, and the positional relationship 122. For example, data indicating that the positional relationship 122 with the object is "distant" when the distance of an object from the RFID reader 108 with the maximum readable distance of 10 meters (at which the response ratio is zero) is 7 to 10 meters is defined and stored in the distance definition DB 120. Defining the positional relationship using words (for example, "distant" and "near") to allow human beings to intuitively understand the positional relationship is advantageous over defining the positional relationship using specific numerical quantities (for example, 8 meters) in that it is possible to create a rule DB, which can be intuitively understood by human beings, such as the content DB 140 described later. To suit the intuition of human beings, fuzzy logic may be used for the positional relationship 122 with an object. Specifically, defining respective attribute (membership) functions of attributes makes it possible to handle words referring to quantity using word values. Of course, the number of words such as distant and near can be freely set and changed to suit the intuition of human beings.

Figure 8:
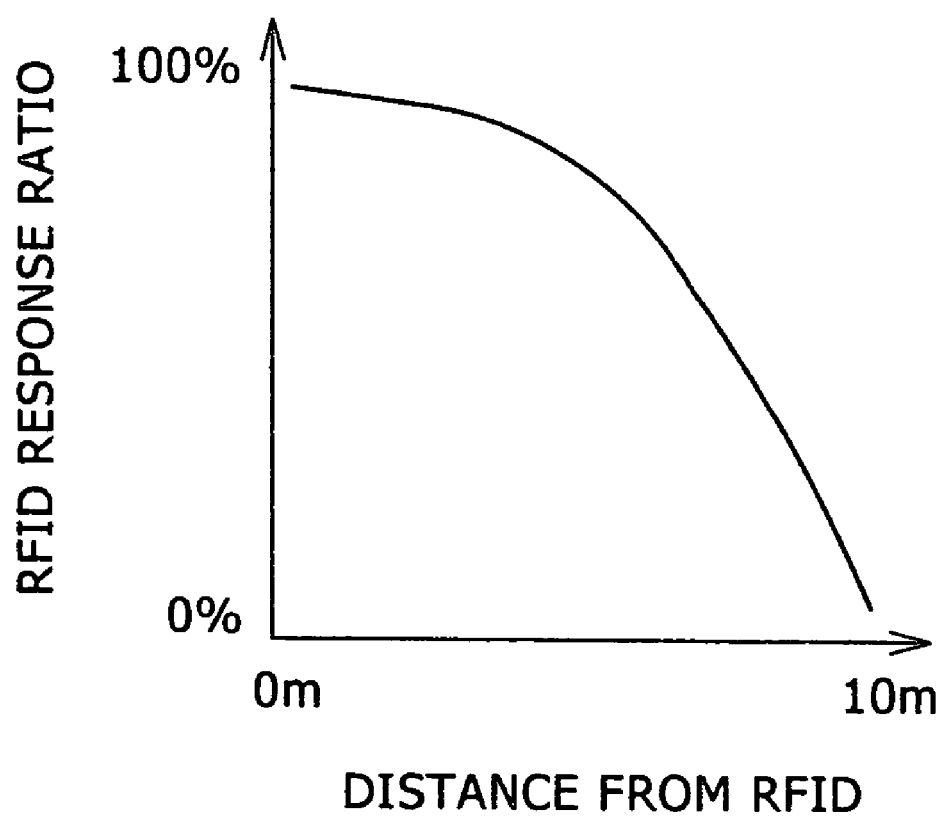
FIG. 8 illustrates the relationship between the response ratio of an RFID tag and the distance to an object (i.e., the RFID tag)

FIG. 8 illustrates the relationship between the response ratio of the RFID tag 200 and the distance to the object (i.e., the RFID tag 200). As is known in the art, if the maximum communication distance between the RFID reader 108 and the RFID tag 200 is 10 meters, the response ratio, which is the ratio of the number of times the RFID reader 108 has received a response signal from an RFID tag 200 to the number of times the RFID reader 108 has performed RFID reading per unit time, is 0% when the distance between the RFID reader 108 and the RFID tag 200 is greater than 10 meters and 100% when the distance is almost zero. This characteristic is illustrated in FIG. 8. Based on such knowledge, the relationship between the response ratio 123, which is the ratio of the number of times the RFID reader 108 has received a response signal from an RFID tag to the number of times the RFID reader 108 has performed RFID reading per unit time, and the distance 121 to an object (i.e., the RFID tag 200) are defined in the distance definition DB 120.

The distance specifying DB 130 defines the positional relationship between the number of times an ID from each RFID tag was able to be read and the object. As shown in FIG. 10A(c), the RFID tag response ratios are converted into RFID read count ranges 131 and the distance specifying DB 130 includes a collection of records, each including a read count range 131 and a positional relationship 132 with an object, which is associated with the distance to the object. When the number of times an ID from an RFID tag 200 was able to be read per unit time is, for example, 100, the distance specifying DB 130 defines that, if the RFID reader 108 has read the ID all the 100 times, the distance between the RFID reader 108 and the RFID tag 200 is 0 to 3 meters, thereby determining that the RFID reader 108 and the RFID tag 200 are located near each other. On the other hand, the distance specifying DB 130 defines that, if the RFID tag 200 was able to be read only 10 times, the distance between the RFID reader 108 and the RFID tag 200 is equal to or greater than 7 meters, thereby determining that the RFID reader 108 and the RFID tag 200 are located distant from each other. Specifically, the distance specifying DB 130 defines that the positional relationship 132 with the object is "distant" if the range 131 of the number of times an ID from the RFID tag 200 was able to be read is 0 to 30, the positional relationship 132 is "intermediate" if the range 131 is 31 to 70, and the positional relationship 132 is "near" if the range 131 is 71 to 100. Defining the positional relationship using words is advantageous in that, even if electromagnetic interference or the like causes some slight errors in the number of times the RFID tag 200 was able to be read, it is possible to cope with such errors using indefinite words used by human beings.

The distance determination file 170 is created with reference to the counting file 160 and the distance specifying DB 130 in association with each other. Specifically, as shown in FIG. 10A(d), the distance determination file 170 compares the RFID read count 162 for each ID 161 in the counting file 160 with the RFID read count ranges 131 of the distance specifying DB 130 and extracts a positional relationship 132 with an object associated with an RFID read count range 131 corresponding to each ID 161. That is, the distance specifying file 170 is created by storing an extracted object distance (i.e., the positional relationship with the object) 172 in association with each ID 161. The distance determination file 170 is programmed so as to be reset after being used in a content acquisition process.

As shown in FIG. 10A(e), the content DB 140 includes a collection of records, each associating the positional relationship 172 with the object (i.e., the distance to the object) with content 143 for each ID 161. Since the content DB 140 handles the distance 172 to the object as a word, the content 143 can be specified according to a rule that it is easy for human beings to intuitively understand, such as content specified when the object is distant, content specified when the object is near, and the like.

As shown in FIG. 10B(f), the display magnification DB 150 includes a collection of records, each having an RFID read count range 151 and a display magnification 152. The display magnification 152 defines the font size of content to be displayed on the display. The greater the number of times an ID from an RFID was able to be read is, the nearer the RFID reader 108 and the RFID tag 200 are located to each other and the higher the display magnification is. This is defined based on the assumption that, when a person is located near an object, they are showing interest in the object. This makes it possible to provide a display method which allows the user to see at a glance where information is placed by viewing the display.

The log file 165 stores contents of the counting file 160 as a log. Specifically, as shown in FIG. 10B(g), an ID 166 read one second (unit time) ago and the number of times 167 the ID from the RFID tag was able to be read are recorded and retained in the log file 165 every second (unit time).

The behavioral state DB 180 associates, for each ID 161, a value obtained by subtracting the RFID read count 167 stored in the log file 165 from the RFID read count 162 stored in the counting file 160 with a behavioral state and defines the associations between RFID read count changes 181, which indicate changes in the number of times the ID from the RFID tag was able to be read, and behavioral states 182. Specifically, as shown in FIG. 10B(h), the behavioral state DB 180 defines that a person who holds the RFID reader 108 is moving away from an RFID tag if the number of times an ID from the RFID tag was able to be read has decreased from 100 to 20, and the person is motionless if the number of times is left unchanged, and the person is approaching the RFID tag if the number of times has increased from 20 to 100.

The behavioral state file 185 specifies a behavioral state of a person who holds the RFID reader-equipped information terminal 100 for each RFID tag 200 and is updated constantly (specifically, every second). Specifically, the behavioral state file 185 associates IDs 186 with behavioral states 187 as shown in FIG. 10B(i).

As shown in FIG. 10C(j), the content DB 145 added with behavioral states is constructed by adding behavioral states 148, as conditions used to obtain content, to the content DB 140 described above. Adding the behavioral states 148 as conditions used to obtain content to the content DB 140 ensures that more appropriate information is provided to the user.

As shown in FIG. 10C(k), the content DB 190 for outputting content based on conditions associated with positions of two tags is a modification of the above-described content DB 140, which is applied when two RFID tags have been read and which makes it possible to obtain content corresponding to IDs of two RFID tags and positional relationships with the two RFID tags. This can provide the user with content which combines information including information of two RFID tags, comparison information, and the like.

Figure 4:
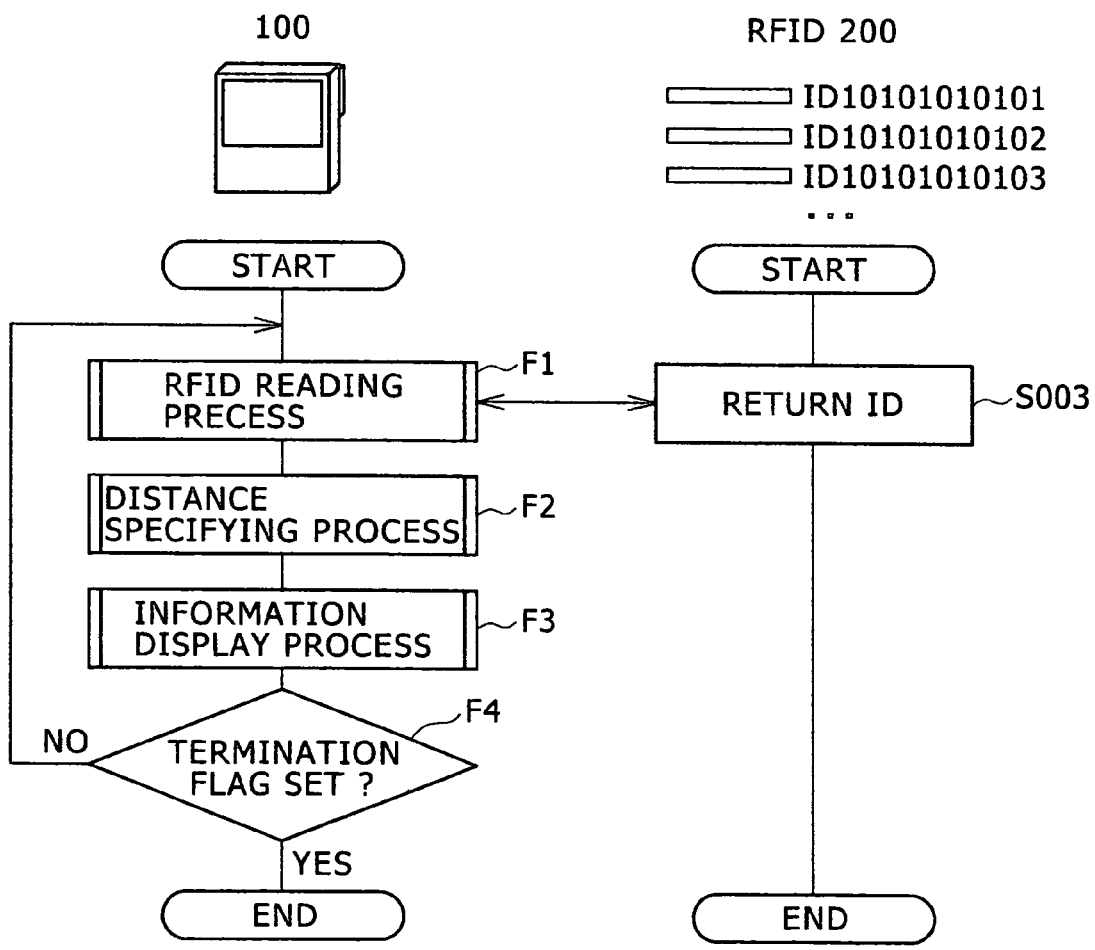
FIG. 4 is a flowchart of an overall basic procedure of a first embodiment of the present invention.

FIG. 4 is a flowchart of an overall basic procedure of the first embodiment of the present invention. The following is a description of the procedure of FIG. 4.

(1) When the system according to the embodiment of the present invention is activated, for example, as a user of the RFID reader-equipped information terminal 100 manipulates the terminal 100 to power it on, the RFID reader 108 in the RFID reader-equipped information terminal 100 first performs a process for reading an ID from an RFID tag 200 by generating a wireless signal as a reading signal and then receiving a response signal from the RFID tag 200. For this process, conventional systems using barcodes require that the user read barcodes one by one while recognizing where the barcodes have been attached. On the other hand, the system using RFID tags can perform the reading process without requiring that the user recognize where the RFID tags are located since RFID tags 200 automatically return response waves when they have received a radio wave generated by the RFID reader within a certain area. Since RFID tags 200 located in a communication range transmit their IDs as responses to a wireless signal generated by the RFID reader 108, the RFID reader 108 performs the process for reading IDs from the RFID tags 200 by receiving the responses from the RFID tags 200, for example, 100 times in a second (step F1, S003).

(2) Then, the RFID reader-equipped information terminal 100 specifies the distance between the RFID reader 108 and the RFID tags 200 based on results of the reading of IDs from the RFID tags 200 at step F1. This process is based on a principle that the number of times an ID from an RFID tag 200 was able to be read decreases in proportion to the distance to the RFID tag 200, provided that the number of times a wireless signal for RFID reading is generated per unit time is constant. Accordingly, in this process, the distance to the RFID tag 200 can be very easily measured using only the number of times an ID from the RFID was able to be read per unit time (step F2).

(3) Then, the RFID reader-equipped information terminal 100 performs an information display process to display content corresponding to the distance information specified at step F2 on the display 107 of the terminal 100. The procedure of steps F1 to F3 is repeated and the content displayed on the display is updated constantly, for example, until an ending process is performed to power off the RFID reader-equipped information terminal. Of course, the function of the interface 103 of the RFID reader-equipped information terminal 100 may be enhanced to add a process for suspending the update of the content, thereby allowing the user to carefully view the information. In the embodiment of the present invention, the update time interval, which is set to one second in the above example, may be freely changed to update the information at times suitable for the personality of a person (for example, a person who moves quickly or a person who moves slowly) or suitable for the place (for example, an art museum or a station) (steps F3, F4).

Figure 5:
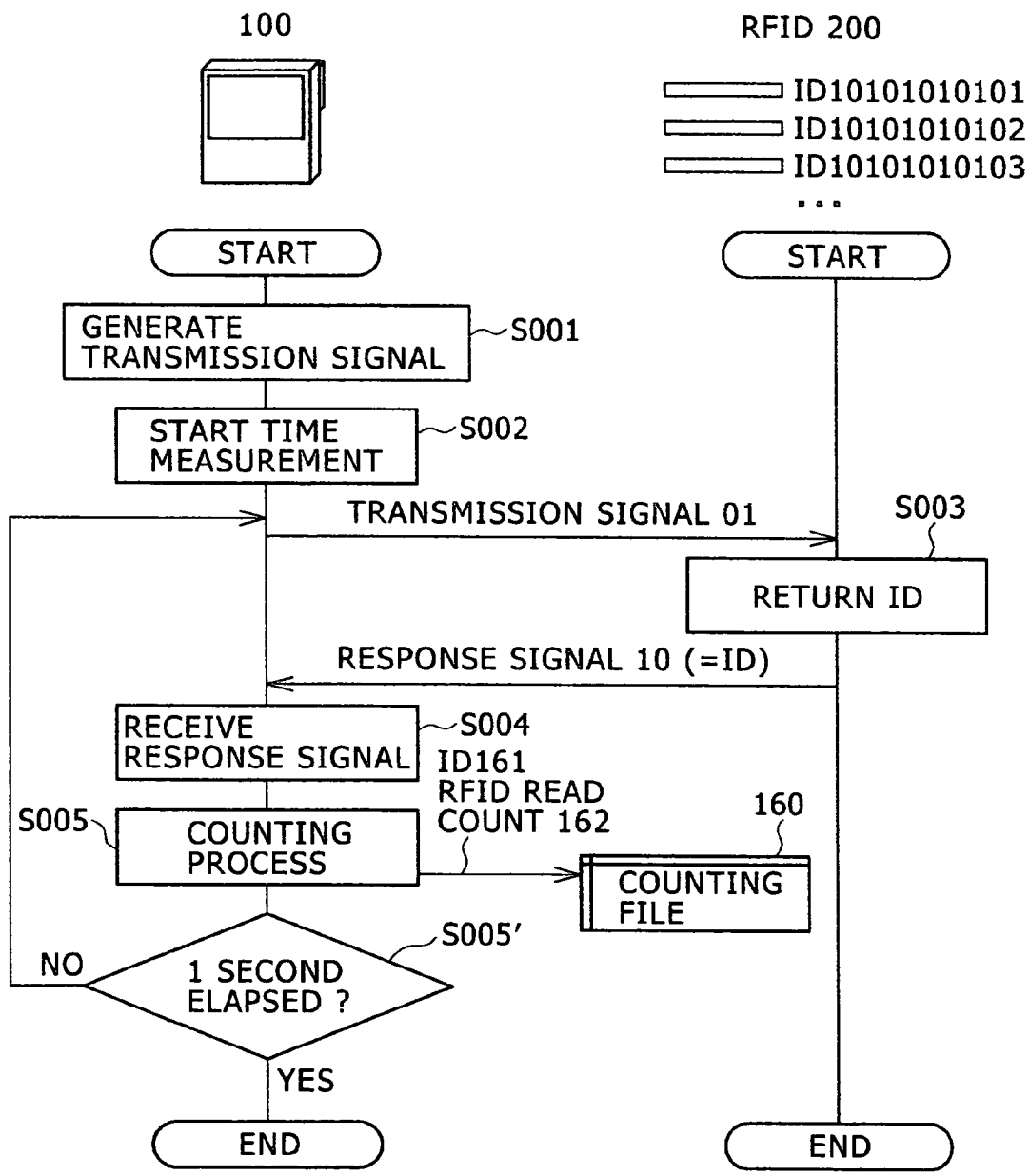
FIG. 5 is a flowchart of a detailed procedure of an RFID reading process at step F1 in the flowchart shown in FIG. 4.

FIG. 5 is a flowchart of a detailed procedure of the RFID reading process at step F1 in the flowchart shown in FIG. 4. The following is a description of the procedure of FIG. 5.

(1) First, the RFID reader 108 of the RFID reader-equipped information terminal 100 transmits a transmission signal "01" and starts measuring a reading time during which RFID reading has been performed to measure a counting time during which RFID read counting has been performed (steps S001 and S002). Starting measuring the reading time may be synchronized with the transmission signal "01".

(2) The transmission signal 01 transmitted at step S001 is propagated through the air and, upon receiving the transmission signal 01, each of a plurality of RFID tags 200 in a communication range returns an ID stored in the storage 205 as a response signal 10 to the RFID reader-equipped information terminal 100. This process is performed in such a manner that the RFID reader 108 automatically detects RFID tags 200 located in a reading area without requiring the person to be conscious of where RFID tags 200 are located (S003).

(3) Then, the RFID reader 108 receives the response signals transmitted from the RFID tags 200. Since RFID tags 200 carry their IDs through wireless signals, this process makes it possible to automatically identify which IDs have been read without requiring the person to be conscious of the same. Here, some RFID tags 200 present in the reading area of the RFID reader-equipped information terminal 100 may not respond to the transmission signal and thus not return the response signals 10. This is because, as the distance between the RFID reader 108 and an RFID tag 200 increases, the electromagnetic energy of a response signal which is propagated from the RFID tag 200 through the air decreases and thus the response ratio of the RFID tag 200 decreases as described above with reference to FIG. 8. In addition, since the response ratio of an RFID tag 200 is in proportion to the number of times the RFID reader 108 was able to read an ID from the RFID tag 200 as shown in FIG. 9, the number of times decreases as the distance between the RFID tag 200 and the RFID reader 108 increases. On the other hand, once the number of times an ID was able to be read from an RFID tag is known, distance data regarding the distance from the RFID reader 108 to the RFID tag 200 is uniquely determined (S004).

(4) Then, using IDs of response signals received from the RFID tags 200, the RFID reader 108 determines and records the read IDs 161 and the RFID read counts 162 in the format of the counting file 160 shown in FIG. 10A(a) (S005).

(5) It is then determined whether or not the measuring time has elapsed one second. If the measuring time has elapsed one second, the procedure is terminated. Otherwise, the procedure returns to step S003 to repeat the process for determining the RFID read count 162 and the ID 161 read based on the transmission signals 01 continually transmitted and to repeat updating the counting file 160 (S005').

The procedure until the counting file 160 is updated is automatically performed by the RFID reader 108 without requiring a manual operation of the person. Although the RFID read counting process to create the counting file 160 is performed using wireless information communication in the above method in the embodiment of the present invention, the present invention is not limited to the above method.

Figure 6:
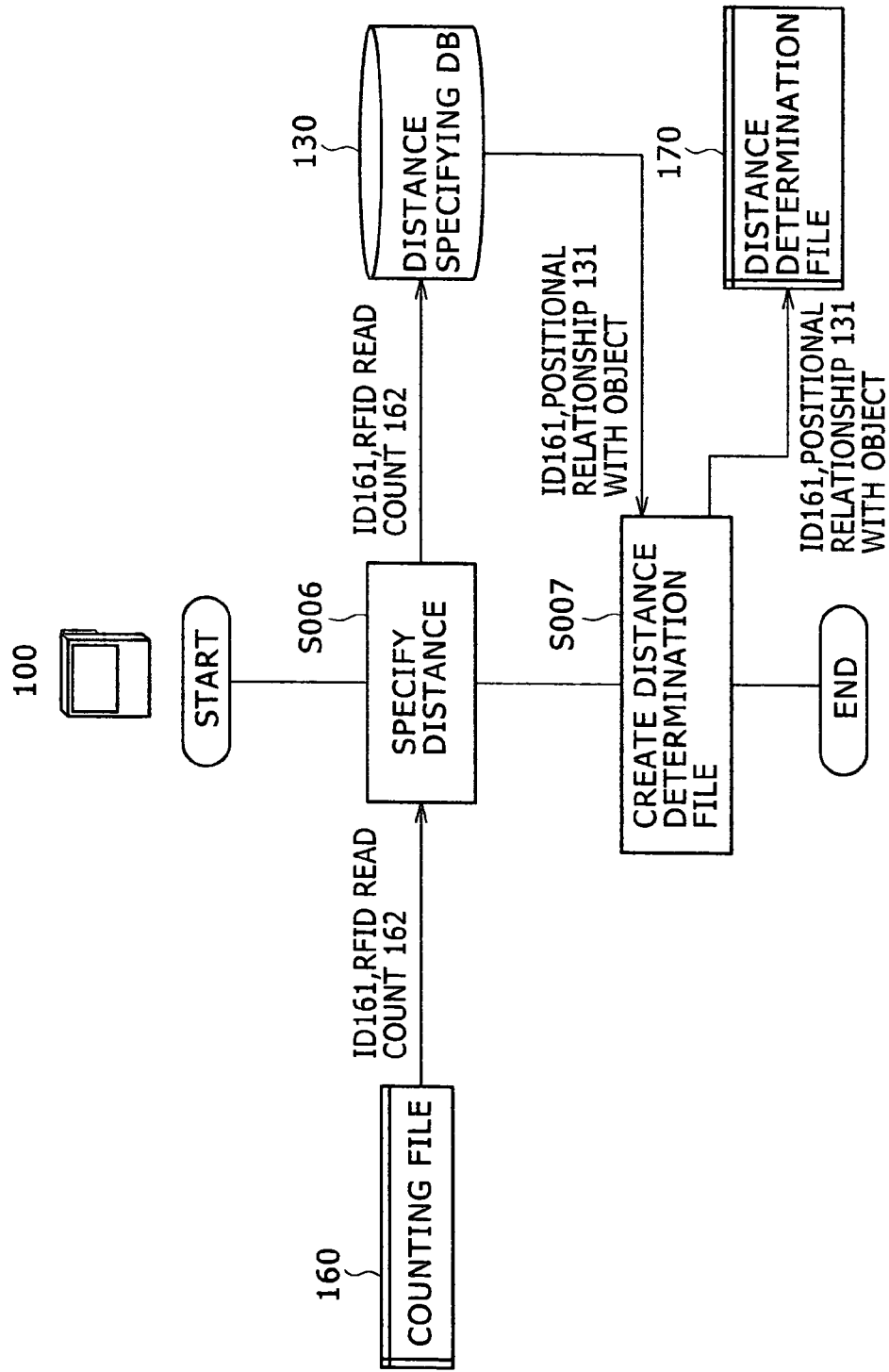
FIG. 6 is a flowchart of a detailed procedure of a distance specifying process at step F2 in the flowchart shown in FIG. 4 in which the distance between an RFID reader and RFID tags is calculated based on a counting file of the read RFID tags.

FIG. 6 is a flowchart of a detailed procedure of the distance specifying process at step F2 in the flowchart shown in FIG. 4 in which the distance between the RFID reader 108 and the RFID tags 200 is calculated based on the counting file 160 of the read RFID tags 200. The following is a description of the procedure of FIG. 6.

(1) First, the contents of the counting file 160 created in the procedure described above with reference to FIG. 5 are used to convert the response ratios of the distance definition DB 120 shown in FIG. 10A(b) into the number of times RFID reading was able to be performed per second, and the distance between the RFID reader 108 and the RFID tags 200 is specified simply using the RFID read count ranges 131 and the position relationships 132 of the distance specifying DB 130 shown in FIG. 10A(c). Here, the quantitative definitions of words "distant" and "near" can be obtained with reference to the distance definition DB 120. This process is performed by specifying a positional relationship 132 with the corresponding object with reference to the RFID read count ranges 131 of the distance specifying DB 130 and the RFID read counts 162 of the counting file 160 in association with each other (S006).

(2) Then, the IDs 161 of the counting file 160 and the positional relationships 172 with objects are used to create the distance determination file 170 as shown in FIG. 10A(d). Since the distance determination file 170 is created based on a very simple principle that the RFID read count decreases as the distance between the RFID tag and the RFID reader increases, this procedure requires simple calculation, compared to distance measurement methods based on the propagation time or intensity of radio signals, so that the procedure can be incorporated into a very simple program (step S007).

Figure 7:
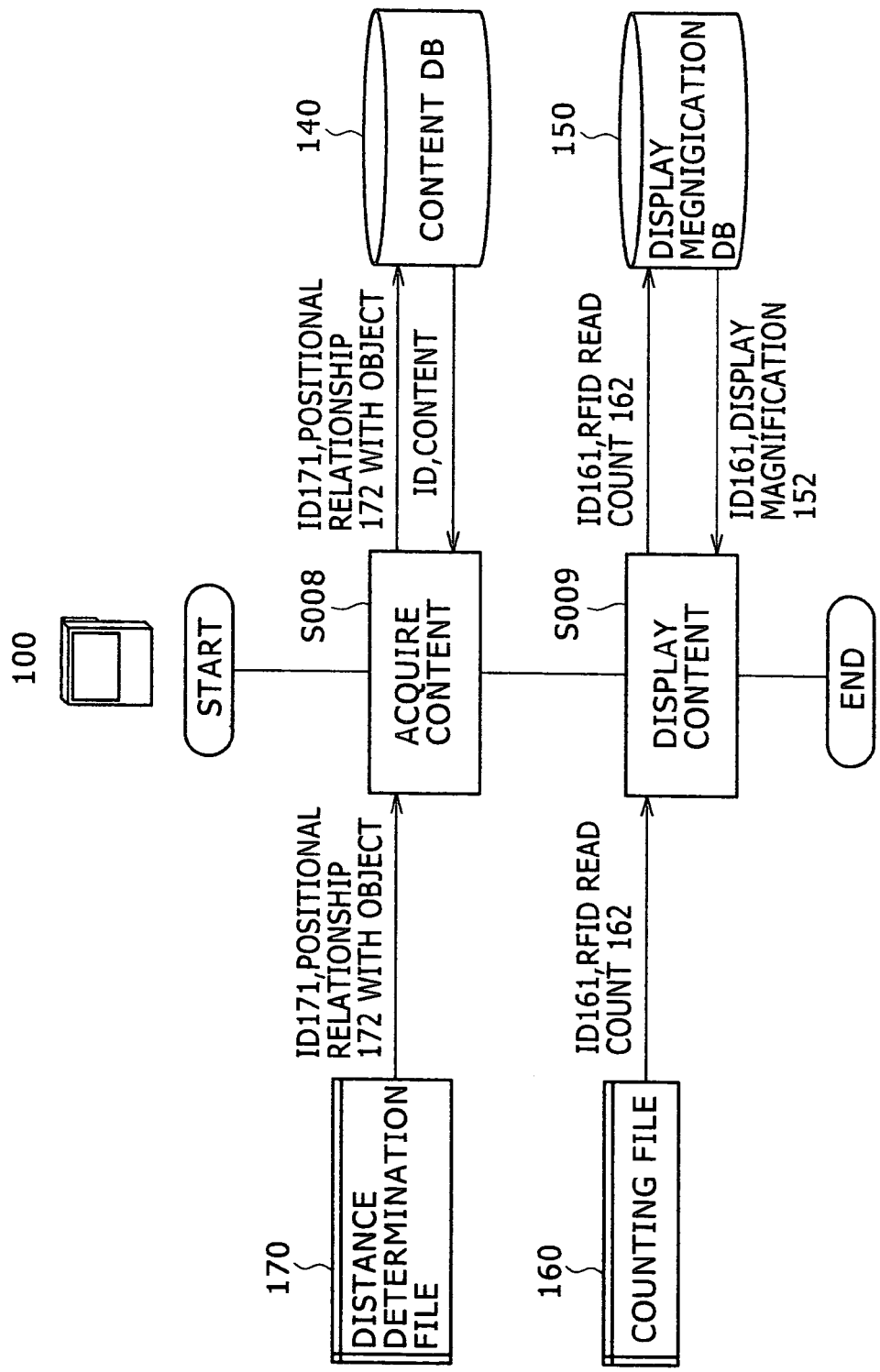
FIG. 7 is a flowchart of a detailed procedure of an information display process at step F3 in the flowchart shown in FIG. 4 in which content corresponding to a calculated positional relationship with an object is displayed.

FIG. 7 is a flowchart of a detailed procedure of the information display process at step F3 in the flowchart shown in FIG. 4 in which content is displayed according to the calculated positional relationship with the object. The following is a description of the procedure of FIG. 7.

(1) First, content 143 to be displayed for each ID is obtained with reference to the content DB 140 shown in FIG. 10A(e) and the created distance determination file 170 in association with each other. This process makes it possible to provide content according to a rule that can be easily understood by human beings since the content is defined based on words expressing distances such as near, intermediate, and distant. Here, the procedure may further include a process for calculating the time during which the positional relationship with the object is not changed and updating content based on a motionless time of, for example, 15 seconds. This process allows the information provider to release content to bring the motionless person close to the object or to provide detailed production history information without requiring a manual (or touching) operation of the person (step S008). The content DB 140 may be constructed to be connected to the RFID reader-equipped information terminal 100 through a network. That is, the content DB 140 may be installed outside the RFID reader-equipped information terminal 100.

(2) Then, the obtained content 143 is displayed on the display 107. Obtained content items 143 are displayed on the screen, for example, from the top to the bottom in the order in which they were read. Older content is displayed on the screen at an upper position. Older content may be displayed on the screen at an upper position in a display method in which content items displayed on the screen are updated one after another with a new content item so that they can be easily viewed by persons. Other display methods may also be used. The displayed area ratio of the content to be displayed on the screen is changed according to the corresponding RFID read count 162. This is based on the assumption that, when the RFID read count is higher, the person is located nearer to the object and shows more interest in it. In order to provide content attracting interest in an easily readable (or understandable) manner, the displayed area ratio of the content to be displayed on the screen is increased to increase the rate at which the content reaches eyes of the person, whereby the person views and reads the content most easily among content displayed on the screen. Specifically, the relationship between RFID read counts 151 and display magnifications 152 is defined as shown in FIG. 10B(f) and content is displayed on the screen at the corresponding display magnification 152 (step S009).

Figure 11:
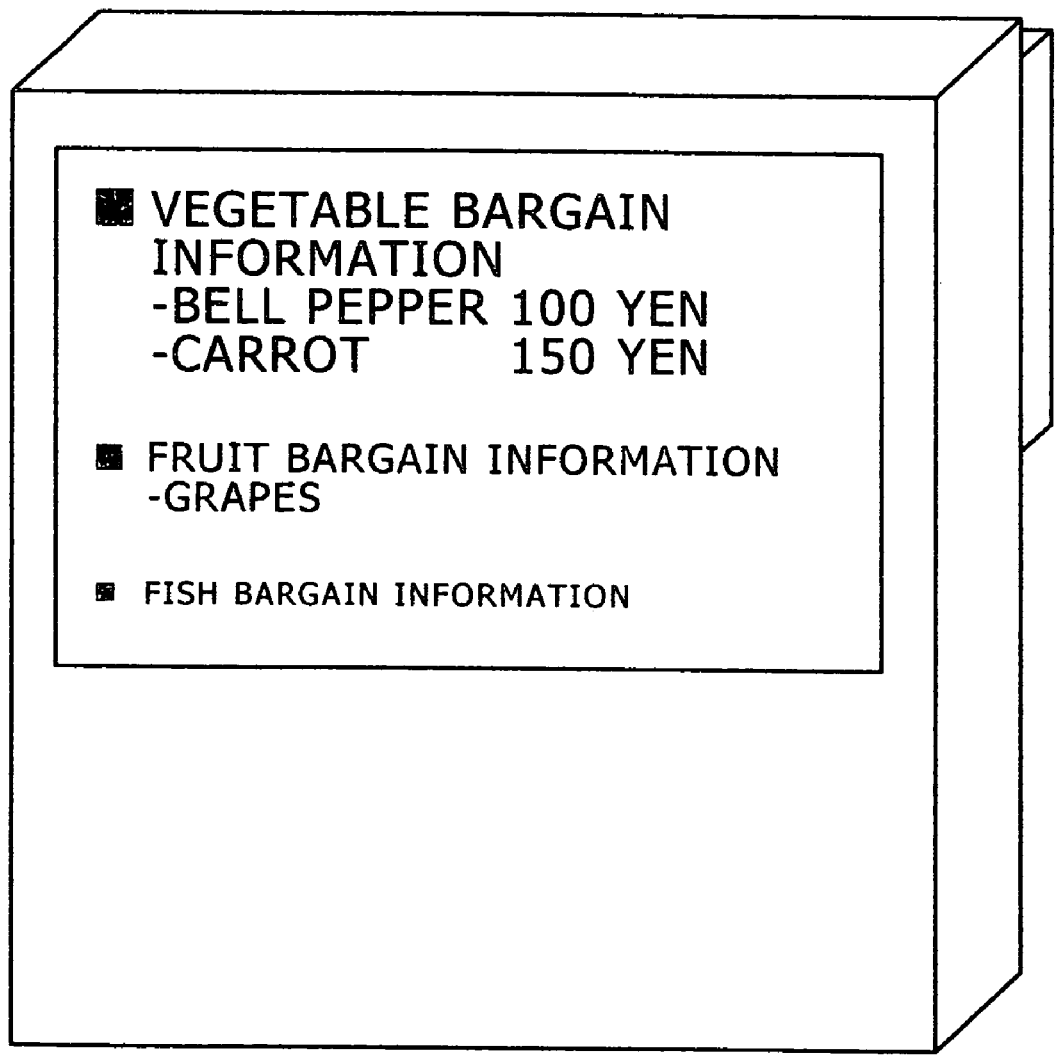
FIG. 11 illustrates an example display screen based on the relationship between RFID read counts and display magnifications.

FIG. 11 illustrates an example display screen in the process of step S009 based on the relationship between the RFID read count 151 and the display magnification 152. In the example of FIG. 11, when a person who uses the RFID reader-equipped terminal 100 is located near the vegetable section as shown in FIG. 1, information of bargain vegetables in the vegetable section is displayed large and information of bargain fruits in the next fruit section is displayed smaller than that of the bargain vegetables. Desired information may be highlighted not only by displaying characters or the like in a different size but also by displaying a dynamically changing image or by giving specific color to the information.

In the above example, suitable information is provided based only on position information of a person who uses the RFID reader-equipped terminal. 100. In the following, we describe a method according to a second embodiment of the present invention in which more suitable information is provided based not only on the position information but also on a behavioral state of the person.

FIG. 12 is a flowchart of an overall basic procedure of the second embodiment of the present invention. This procedure adds a behavioral state specifying process of step F5, in which a behavioral state of the person is specified, between the distance measuring process of step F2 and the information display process of step F3 in the procedure shown in FIG. 4 which illustrates the overall basic procedure of the first embodiment.

(1) First, the RFID reading process of step F1 and S003 and the distance specifying process of step F2 are performed sequentially. A description of these processes is omitted since the processes are similar to those described above with reference to FIG. 4.

(2) The following is a description of the process of the added step F5. This process detects a change (increase or decrease) in the read count and determines a behavioral state of the person based on the fact that an increase in the read count indicates that the person is moving closer to the object and a decrease in the read count indicates that the person is moving away from the object. This process is advantageous in that the behavioral state of the person can be easily determined by processing the information of the distance specifying file 170 obtained in the process of step F2 without acquiring new information required to determine the behavioral state of the person.

The following is a detailed description of the process of the added step F5.

First, an RFID read count change 181 is calculated by subtracting an RFID read count of one second ago from a current RFID read count for each ID 161 of the counting file 160 shown in FIG. 10A(a) that is updated every second. However, when RFID reading is performed initially or when no RFID was read one second ago, the RFID read count change 181 is calculated by subtracting 0 from the current RFID read count, so that it is equal to the current read count.

Then, a behavioral state 182 associated with the calculated RFID read count change 181 is obtained with reference to the behavioral state DB 180 shown in FIG. 10B(h) in association with the calculated RFID read count change 181. RFID read counts of one second ago are stored by copying the contents of the counting file 160 to the log file 165 shown in FIG. 10B(g). The log file 165 is empty initially. Then, a behavioral state file 185 which associates IDs 186 with behavioral states 187 as shown in FIG. 10B(i) is generated based on results of the reference.

(3) The process of step F3 is performed in the following manner. The process of step F3 makes a change to the process of step S008 described above in the procedure shown in FIG. 7 such that the behavioral state of the person obtained in the process of the above step F5 is added to conditions used for the content acquisition process. This process of step F3 makes it possible to provide more detailed information than when content is acquired using only the positional relationship between the person and the object. For example, it is possible to provide a variety of different content according to behavioral states, which includes content provided when a distant person is moving closer to the object and content provided when a distant person is motionless.

FIG. 13 is a flowchart of a detailed procedure of the information display process at step F3. At step F3, content is obtained and displayed based not only on the positional relationship between the RFID reader-equipped terminal and the object but also on the behavioral state.

(1) In the changed content acquisition process of step S008, content corresponding to the behavioral state is obtained with reference not only to the counting file 160 but also to the behavioral state file although content is obtained with reference only to the counting file 160 in the example of FIG. 7. Specifically, the content DB 140 shown in FIG. 10A(e) is changed to the content DB 145 shown in FIG. 10C(j), and a positional relationship 162 with an object is obtained from the counting file 160 and a behavioral state 187 is obtained from the behavioral state file 185 for each ID, and then content 149 corresponding to both the positional relationship 162 and the behavioral state 187 is obtained with reference to the content DB 145.

(2) Then, the information display process of step S009 is performed based on the obtained content 149. A description of this process is omitted since the process is similar to that described above with reference to FIG. 7.

The following is a description of an example method according to a third embodiment of the present invention in which content associating two or more information is provided when IDs have been read from two or more RFID tags 200.

All processes of the method according to the third embodiment are basically similar to those of the first embodiment described with reference to FIG. 4. However, the method according to the third embodiment includes a different content acquisition process from that of step S008 of FIG. 7 which illustrates a detailed procedure of step F3 in FIG. 4. Specifically, in the method of the first embodiment, content associated with each individual RFID tag is displayed when a plurality of RFID tags has been read. On the other hand, in the method of the third embodiment, content associated with a plurality of RFID tags is displayed when the plurality of RFID tags has been read.

For example, when a person is located in an art museum near both art works X and Y with an RFID tag attached to each of the art works X and Y, content indicating the difference between the art works X and Y is provided, whereas, when the person is located distant from both the art works X and Y, content attracting common interest in the art works X and Y is provided. That is, in the third embodiment, content is selected based on the positional relationship of the person with the plurality of RFID tags, thereby making it possible to provide information suitable for the person.

The following is a description of a detailed procedure according to the third embodiment. In the following description of the procedure, reading of a plurality of RFID tags is limited to reading of two RFID tags for ease of explanation. A description of a procedure when three or more RFID tags have been read is not necessary because the procedure when three or more RFID tags have been read is performed in the same manner as when two RFID tags have been read and the procedure when two RFID tags have been read can be easily extended to the procedure when three or more RFID tags have been read.

First, the same processes as those of steps F1 and F2 of the first embodiment described above with reference to FIG. 4 are performed. These processes create a distance determination file 170 that associates each pair of IDs 161 of two RFID tags 200 with a positional relationship 172. Then, the same content acquisition process as that of step S008 of FIG. 7, which illustrates a detailed procedure of the process of step F3, is performed. This process is to obtain content 195 corresponding to the IDs 161 of the two RFID tags 200 and their associated positional relationships 172 with reference to the content DB 190 shown in FIG. 10C(k). Then, an information display process of the content 195 obtained at step S009 is performed. A description of this process is omitted since the process is similar to that described above with reference to FIG. 7.

This embodiment is not limited to displaying a plurality of contents. For example, when read (or reception) counts of IDs of RFID tags are 30, 50, and 70, content corresponding to one of the IDs with the largest reception count may be displayed.

On the other hand, even when the reception count of an RFID tag is zero, content of the RFID tag at a distance greater than the maximum readable distance may be displayed. To prevent this problem, a certain threshold may be set for the reception count.

It is not necessary to wait until the reception period of time has elapsed. For example, when it is determined that RFID reception was able to be performed more than a predetermined number of times (for example, 70 times), the receiving process may be terminated to output content at that time, thereby increasing the processing speed.

Each process in each of the above embodiments of the present invention may be implemented by a program, which may be executed by a CPU included in a computer. Each program may be provided as being stored in a recording medium such as FD, CD-ROM, and DVD or may be provided in the form of digital information through a network.

The present embodiments can be applied to various scenes in which information is provided in various places. Specifically, the present embodiments can be applied to, for example, a technology for providing information of products located near a person to the person in a supermarket or a technology for providing information substituting for a direction board to direct persons in public places. The present invention can also be applied to analysis of movement paths of persons to utilize the movement paths in marketing.

The following is an embodiment in which the technology of the present invention is applied to marketing using movement paths.

This embodiment is applied to a system which is provided with a display including a reader and which changes display according to the distance to a person who holds a tag when the person approaches the reader. This system can perform display according to the distance between the person having a tag and the display or to changes in the distance. This system can be applied to display of behavior instructions to persons who are escaping in an emergency situation and can also be used as advertising media. When the system is used as advertising media, information of a tag which is moving away may not be displayed or may also be displayed depending on design specifications. In this case, content attracting interest of a person who is moving away may be displayed and an advertisement for pulling the person back may be displayed.

It is also possible to calculate an acceleration of the RFID reader-equipped information terminal 100 when it is approaching or moving away. The acceleration can be calculated by arranging reception counts of unit times in chronological order and calculating the rate of change of the reception count per unit time. This makes it possible to determine even movement states of the user such as whether or not the user is approaching in a hurry.

The movement speed of the RFID reader-equipped information terminal 100 can also be calculated by calculating the change of the reception count per unit time.

The technologies of the present embodiments are also useful in management of goods in a facility or in confirmation of the whereabouts of a person.

In conventional technologies for management of goods or whereabouts of persons, tags are disposed at specific positions inside or outside a building to specify the positions. Information of the positions of the tags is stored in a reader. A reader which requires position information detects tags, the positions of which are already known to the reader, when it has come to a position at which it can detect radio waves from the tags and guesses its own position by checking the detected positions of the tags with reference to the stored information. Although the reader is carried by a user in the present embodiments, a system in which a tag is carried by a user can also be implemented. The following is an example of this system.

The distance estimation function according to the present embodiments makes it possible to locate a person buried in a disaster such as an earthquake. This can be accomplished, for example, by letting persons carry an RFID tag or attach an RFID tag to their clothes and measuring the distance between the RFID tag and the RFID reader-equipped information terminal 100. When a disaster occurs in the case where tags are arranged in a building, the disaster may move the tags, making their arrangement information meaningless. Thus, the conventional technologies are ineffective in such a scene. However, the technologies of the present embodiments are effective in such a scene because it is possible to estimate the position from one tag.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless signal receiver for receiving a signal generated by a wireless tag, the receiver comprising:
   a storage in which a reception count and information according to the reception count are stored in association with each other, the reception count being the number of times a signal generated by the wireless tag is received in a specific time interval;
   a reception unit that receives the signal that the wireless tag generates a predetermined number of times in each period having the specific time interval;

a measurer that measures the reception count of the signal as the number of times the signal is received;

a specifier that specifies information corresponding to the measured reception count with reference to the storage; and a processor that performs a process according to the specified information.

2. The wireless signal receiver according to claim 1, wherein the storage stores, as the information, distance data indicating a distance between the wireless signal receiver and the wireless tag; and the specifier specifies distance data corresponding to the measured reception count.

3. The wireless signal receiver according to claim 2, wherein the measurer measures a reception count of the wireless tag in each of a plurality of periods;

the specifier specifies distance data indicating a distance from the wireless signal receiver to the wireless tag in each of the plurality of periods; and the processor determines, based on the specified distance data in each of the plurality of periods, whether or not the wireless signal receiver has approached the wireless tag.

4. The wireless signal receiver according to claim 2, wherein the storage stores, as the distance data, distance data indicating the distance that decreases as the reception count increases.

5. The wireless signal receiver according to claim 4, wherein a plurality of the wireless tags is provided;

the measurer measures reception counts of the plurality of wireless tags in each of the plurality of periods;

the specifier specifies distance data of each of the plurality of tags in each of the plurality of periods; and the processor estimates, based on the specified distance data, whether or not the wireless signal receiver has approached each of the plurality of wireless tags and calculates movement path information of the plurality of wireless tags from the estimation of each of the wireless tags.

6. The wireless signal receiver according to claim 2, wherein the storage stores a plurality of content data pieces while associating each piece of the plurality of content data with each piece of the corresponding distance data; and the processor searches for content data corresponding to the specified distance data and outputs the content data.

7. The wireless signal receiver according to claim 6, wherein a plurality of the wireless tags is provided;

the reception unit receives identification information which each of the plurality of the wireless tags generates as the signal;

the storage stores the identification information in association with the content data;

the measurer measures a reception count of each pieces of received identification information of the plurality of wireless tags, the reception count being the number of times the identification information is received;

the specifier specifies a plurality of distance data pieces indicating distances between the wireless signal receiver and the plurality of wireless tags according to the respective reception counts of the identification information of the plurality of wireless tags; and the processor searches for content data corresponding to identification information of distance data indicating a minimum distance among the plurality of specified distance data pieces and outputs the content data.

8. The wireless signal receiver according to claim 6, wherein a plurality of wireless tags is provided;

the reception unit receives identification information which each of the plurality of the wireless tags generates as the signal;

the reception unit receives the identification information;

the storage stores the identification information in association with the content data;

the measurer measures a reception count of each received identification information piece of the plurality of wireless tags, the reception count being the number of times the identification information is received;

the specifier specifies a plurality of distance data pieces indicating distances between the wireless signal receiver and the plurality of wireless tags according to the respective reception counts of the identification information of the plurality of wireless tags; and the processor more preferentially outputs content data corresponding to distance data indicating a smaller distance among the plurality of specified distance data pieces.

9. The wireless signal receiver according to claim 6, wherein a plurality of the wireless tags including first and second wireless tags is provided;

the storage stores first identification information as identification information of the first wireless tag, second identification information as identification information of the second wireless tag, first reception count information regarding a reception count of the first identification information, second reception count information regarding a reception count of the second identification information, and content data in association with each other;

the reception unit receives identification information which each of the plurality of the wireless tags generates as the signal;

the measurer measures a reception count of each received identification information pieces of the plurality of wireless tags, the reception count being the number of times the identification information is received;

the specifier specifies content data associated with the measured reception count and the received identification information by searching for the content data in the storage; and the processor outputs the specified content data.

10. The wireless signal receiver according to claim 1, wherein the storage stores content data as the information;

the specifier specifies content corresponding to the measured reception count; and the processor outputs the specified content.

11. The wireless signal receiver according to claim 10, wherein a plurality of the wireless tags is provided;

the reception unit receives identification information which each of the plurality of the wireless tags generates as the signal;

the storage stores the identification information in association with the content data;

the measurer measures a reception count of each pieces of received identification information of the plurality of wireless tags, the reception count being the number of times the identification information is received;

the specifier specifies content data corresponding to identification information with a largest reception count among the identification information of the plurality of wireless tags; and the processor outputs the specified content data.

12. The wireless signal receiver according to claim 10, wherein a plurality of the wireless tags is provided;
the reception unit receives identification information which each of the plurality of wireless tags generates as the signal;
the storage stores the identification information in association with the content data;
the measurer measures a reception count of each received identification information piece of the plurality of wireless tags, the reception count being the number of times the identification information is received;
the specifier specifies content data corresponding to identification information according to a reception count of the identification information, and
the processor more preferentially outputs specified content data associated with a larger reception count.

13. The wireless signal receiver according to claim 10, wherein a plurality of the wireless tags including first and second wireless tags is provided;
the storage stores first identification information as identification information of the first wireless tag, second identification information as identification information of the second wireless tag, first reception count information regarding a reception count of the first identification information, second reception count information regarding a reception count of the second identification information, and content data in association with each other;
the reception unit receives identification information which each of the plurality of the wireless tags generates as the signal;
the measurer measures a reception count of each received identification information piece of the plurality of wireless tags, the reception count being the number of times the identification information is received;
the specifier specifies content data associated with the measured reception count and the received identification information by searching for the content data in the storage; and
the processor outputs the specified content data.

14. A wireless signal receiving method for a wireless signal receiver for receiving a signal generated by a wireless tag, the receiving method comprising the steps of:
Providing, in a storage, a reception count and information according to the reception count in association with each other to a storage, the reception count being the number of times a signal generated by the wireless tag is received in a specific time interval;
receiving the signal that the wireless tag generates a predetermined number of times in each period having the specific time interval;
measuring the reception count of the signal as the number of times the signal is received;
specifying information corresponding to the measured reception count with reference to the storage; and
performing a process according to the specified information.

15. The wireless signal receiving method according to claim 14, wherein the providing step includes storing, as the information, distance data indicating a distance between the wireless signal receiving method and the wireless tag; and
the specifying step includes specifying distance data corresponding to the measured reception count.

16. The wireless signal receiving method according to claim 15, wherein the measuring step includes measuring a reception count of the wireless tag in each of a plurality of periods;
the specifying step includes specifying distance data indicating a distance from the wireless signal receiver to the wireless tag in each of the plurality of periods; and
the process performing step includes determining, based on the specified distance data in each of the plurality of periods, whether or not the wireless signal receiving method has approached the wireless tag.

17. The wireless signal receiving method according to claim 15, wherein the providing step includes storing, as the distance data, distance data indicating the distance that decreases as the reception count increases.

18. The wireless signal receiving method according to claim 17,
wherein a plurality of the wireless tags is provided;
the measuring step includes measuring reception counts of the plurality of wireless tags in each of the plurality of periods;
the specifying step includes specifying distance data of each of the plurality of tags in each of the plurality of periods; and
the process performing step includes estimating, based on the specified distance data, whether or not the wireless signal receiving method has approached each of the plurality of wireless tags and calculating movement line information of the plurality of wireless tags from the estimation of each of the wireless tags.

19. The wireless signal receiving method according to claim 15,
wherein the providing step includes storing a plurality of content data pieces while associating each piece of the plurality of content data with each piece of the corresponding distance data; and
the process performing step includes searching for content data corresponding to the specified distance data and outputting the content data.

20. The wireless signal receiving method according to claim 19,
wherein a plurality of the wireless tags is provided;
the receiving step includes receiving identification information which each of the plurality of the wireless tags generates as the signal;
the providing step includes storing the identification information in association with the content data;
the measuring step includes measuring a reception count of each piece of received identification information of the plurality of wireless tags, the reception count being the number of times the identification information is received;
the specifying step includes specifying a plurality of distance data pieces indicating distances between the wireless signal receiver and the plurality of wireless tags according to the respective reception counts of the identification information of the plurality of wireless tags; and
the process performing step includes searching for content data corresponding to identification information of distance data indicating a minimum distance among the plurality of specified distance data pieces and outputting the content data.

21. The wireless signal receiving method according to claim 19,
wherein a plurality of the wireless tags is provided;
the receiving step includes receiving identification information which each of the plurality of the wireless tags generates as the signal;
the providing step includes storing the identification information in association with the content data;

the measuring step includes measuring a reception count of each received identification information pieces of the plurality of wireless tags, the reception count being the number of times the identification information is received;

the specifying step includes specifying a plurality of distance data pieces indicating distances between the wireless signal receiver and the plurality of wireless tags according to the respective reception counts of the identification information of the plurality of wireless tags; and the process performing step includes more preferentially outputting content data corresponding to distance data indicating a smaller distance among the plurality of specified distance data pieces.

22. The wireless signal receiving method according to claim 19, wherein a plurality of the wireless tags including first and second wireless tags is provided;

the providing step includes storing first identification information as identification information of the first wireless tag, second identification information as identification information of the second wireless tag, first reception count information regarding a reception count of the first identification information, second reception count information regarding a reception count of the second identification information, and content data in association with each other;

the receiving step includes receiving identification information which each of the plurality of wireless tags generates as the signal;

the measuring step includes measuring a reception count of each received identification information piece of the plurality of wireless tags, the reception count being the number of times the identification information is received;

the specifying step includes specifying content data associated with the measured reception count and the received identification information by searching for the content data in the storage; and the process performing step includes outputting the specified content data.

23. The wireless signal receiving method according to claim 14, wherein the providing step includes storing content data as the information;

the specifying step includes specifying content corresponding to the measured reception count; and the process performing step includes outputting the specified content.

24. The wireless signal receiving method according to claim 23, wherein a plurality of the wireless tags is provided;

the receiving step includes receiving identification information which each of the plurality of the wireless tags generates as the signal;

the providing step includes storing the identification information in association with the content data;

the measuring step includes measuring a reception count of each piece of received identification information of the plurality of wireless tags, the reception count being the number of times the identification information is received;

the specifying step includes specifying content data corresponding to identification information with a largest reception count among the identification information of the plurality of wireless tags; and the process performing step includes outputting the specified content data.

25. The wireless signal receiving method according to claim 23, wherein a plurality of the wireless tags is provided;

the receiving step includes receiving identification information which each of the plurality of wireless tags generates as the signal;

the providing step includes storing the identification information in association with the content data;

the measuring step includes measuring a reception count of each received identification information piece of the plurality of wireless tags, the reception count being the number of times the identification information is received;

the specifying step includes specifying content data corresponding to identification information according to a reception count of the identification information; and the process performing step includes more preferentially outputting specified content data associated with a larger reception count.

26. The wireless signal receiving method according to claim 23, wherein a plurality of the wireless tags including first and second wireless tags is provided;

the providing step includes storing first identification information as identification information of the first wireless tag, second identification information as identification information of the second wireless tag, first reception count information regarding a reception count of the first identification information, second reception count information regarding a reception count of the second identification information, and content data in association with each other;

the receiving step includes receiving identification information which each of the plurality of the wireless tags generates as the signal;

the measuring step includes measuring a reception count of each received identification information piece of the plurality of wireless tags, the reception count being the number of times the identification information is received;

the specifying step includes specifying content data associated with the measured reception count and the received identification information by searching for the content data in the storage; and the process performing step includes outputting the specified content data.

27. A wireless signal receiver for receiving a signal generated by a wireless tag, the receiver comprising:

a storage in which a reception count and information according to the reception count are stored in association with each other, the reception count being the number of times a signal generated by the wireless tag is received in a specific time interval;

a reception unit that receives the signal that the wireless tag generates a predetermined number of times in each period having the specific time interval; and a processor connected to the reception unit and the storage wherein, according to a program stored in a memory, the processor measures the reception count of the signal as the number of times the signal is received, specifies information corresponding to the measured reception count with reference to the storage, and performs a process according to the specified information.

28. The wireless signal receiver according to claim 27,
wherein the storage stores, as the information, distance data indicating a distance between the wireless signal receiver and the wireless tag; and
the processor specifies distance data corresponding to the measured reception count.

29. The wireless signal receiver according to claim 28, wherein the processor measures a reception count of the wireless tag in each of a plurality of periods, specifies distance data indicating a distance from the wireless signal receiver to the wireless tag in each of the plurality of periods, and determines, based on the specified distance data in each of the plurality of periods, whether or not the wireless signal receiver has approached the wireless tag.

30. The wireless signal receiver according to claim 28, wherein the storage stores, as the distance data, distance data indicating the distance that decreases as the reception count increases.

31. The wireless signal receiver according to claim 30,
wherein a plurality of the wireless tags is provided; and
the processor measures reception counts of the plurality of wireless tags in each of the plurality of periods, specifies distance data of each of the plurality of tags in each of the plurality of periods, and estimates, based on the specified distance data, whether or not the wireless signal receiver has approached each of the plurality of wireless tags and calculates movement line information of the plurality of wireless tags from the estimation of each of the wireless tags.

32. The wireless signal receiver according to claim 28,
wherein the storage stores a plurality of content data pieces while associating each piece of the plurality of content data with each piece of the corresponding distance data; and
the processor searches for content data corresponding to the specified distance data and outputs the content data.

33. The wireless signal receiver according to claim 32,
wherein a plurality of the wireless tags is provided;
the reception unit receives identification information which each of the plurality of the wireless tags generates as the signal;
the storage stores the identification information in association with the content data; and
the processor measures a reception count of each piece of received identification information of the plurality of wireless tags, the reception count being the number of times the identification information is received, specifies a plurality of distance data pieces indicating distances between the wireless signal receiver and the plurality of wireless tags according to the respective reception counts of the identification information of the plurality of wireless tags, and searches for content data corresponding to identification information of distance data indicating a minimum distance among the plurality of specified distance data pieces and outputs the content data.

34. The wireless signal receiver according to claim 32,
wherein a plurality of the wireless tags is provided;
the reception unit receives identification information which each of the plurality of the wireless tags generates as the signal;
the storage stores the identification information in association with the content data; and
the processor measures a reception count of each received identification information piece of the plurality of wireless tags, the reception count being the number of times the identification information is received, specifies a plurality of distance data pieces indicating distances between the wireless signal receiver and the plurality of wireless tags according to the respective reception counts of the identification information of the plurality of wireless tags, and more preferentially outputs content data corresponding to distance data indicating a smaller distance among the plurality of specified distance data pieces.

35. The wireless signal receiver according to claim 32,
wherein a plurality of the wireless tags including first and second wireless tags is provided;
the storage stores first identification information as identification information of the first wireless tag, second identification information as identification information of the second wireless tag, first reception count information regarding a reception count of the first identification information, second reception count information regarding a reception count of the second identification information, and content data in association with each other;
the reception unit receives identification information which each of the plurality of the wireless tags generates as the signal; and
the processor measures a reception count of each received identification information pieces of the plurality of wireless tags, the reception count being the number of times the identification information is received, specifies content data associated with the measured reception count and the received identification information by searching for the content data in the storage, and outputs the specified content data.

36. The wireless signal receiver according to claim 27,
wherein the storage stores content data as the information; and
the processor specifies content corresponding to the measured reception count, and outputs the specified content.

37. The wireless signal receiver according to claim 36,
wherein a plurality of the wireless tags is provided;
the reception unit receives identification information which each of the plurality of the wireless tags generates as the signal;
the storage stores the identification information in association with the content data; and
the processor measures a reception count of each piece of received identification information of the plurality of wireless tags, the reception count being the number of times the identification information is received, specifies content data corresponding to identification information with a largest reception count among the identification information of the plurality of wireless tags, and outputs the specified content data.

38. The wireless signal receiver according to claim 36,
wherein a plurality of the wireless tags is provided;
the reception unit receives identification information which each of the plurality of wireless tags generates as the signal;
the storage stores the identification information in association with the content data; and
the processor measures a reception count of each received identification information piece of the plurality of wireless tags, the reception count being the number of times the identification information is received, specifies content data corresponding to identification information according to a reception count of the identification information, and more preferentially outputs specified content data associated with a larger reception count.

39. The wireless signal receiver according to claim 36, wherein a plurality of the wireless tags including first and second wireless tags is provided;

the storage stores first identification information as identification information of the first wireless tag, second identification information as identification information of the second wireless tag, first reception count information regarding a reception count of the first identification information, second reception count information regarding a reception count of the second identification information, and content data in association with each other;

the reception unit receives identification information which each of the plurality of the wireless tags generates as the signal; and the processor measures a reception count of each received identification information piece of the plurality of wireless tags, the reception count being the number of times the identification information is received, specifies content data associated with the measured reception count and the received identification information by searching for the content data in the storage, and outputs the specified content data.

* * * * *